US010764310B2

(12) United States Patent
Vasseur et al.

(10) Patent No.: US 10,764,310 B2
(45) Date of Patent: *Sep. 1, 2020

(54) DISTRIBUTED FEEDBACK LOOPS FROM THREAT INTELLIGENCE FEEDS TO DISTRIBUTED MACHINE LEARNING SYSTEMS

(71) Applicant: Cisco Technology, Inc., San Jose, CA (US)

(72) Inventors: Jean-Philippe Vasseur, Anchorage, AK (US); Sukrit Dasgupta, Norwood, MA (US); Grégory Mermoud, Veyras (CH)

(73) Assignee: Cisco Technology, Inc., San Jose, CA (US)

(*) Notice: Subject to any disclaimer, the term of this patent is extended or adjusted under 35 U.S.C. 154(b) by 348 days.

This patent is subject to a terminal disclaimer.

(21) Appl. No.: 15/211,231

(22) Filed: Jul. 15, 2016

(65) Prior Publication Data

US 2017/0279836 A1 Sep. 28, 2017

Related U.S. Application Data

(60) Provisional application No. 62/313,483, filed on Mar. 25, 2016.

(51) Int. Cl.
*H04L 29/06* (2006.01)
*G06N 20/00* (2019.01)

(52) U.S. Cl.
CPC ........ *H04L 63/1425* (2013.01); *G06N 20/00* (2019.01); *H04L 63/1458* (2013.01); *H04L 2463/144* (2013.01)

(58) Field of Classification Search
CPC .................. H04L 63/1425; G06N 99/005
See application file for complete search history.

(56) References Cited

U.S. PATENT DOCUMENTS

| 8,813,228 | B2 | 8/2014 | Magee et al. |
|---|---|---|---|
| 8,881,281 | B1 | 11/2014 | Mitchell |
| 9,215,244 | B2 | 12/2015 | Ayyagari et al. |
| 2010/0153316 | A1 | 6/2010 | Duffield et al. |
| 2014/0237599 | A1 | 8/2014 | Gertner et al. |
| 2014/0283052 | A1 | 9/2014 | Jordan et al. |

(Continued)

OTHER PUBLICATIONS

European Search Report dated Aug. 7, 2017 in connection with European Application No. 17 16 2422.

(Continued)

*Primary Examiner* — Oleg Korsak
(74) *Attorney, Agent, or Firm* — Behmke Innovation Group LLC; Kenneth J. Heywood; Jonathon P. Western

(57) ABSTRACT

In one embodiment, a device in a network receives anomaly data regarding an anomaly detected by a machine learning-based anomaly detection mechanism of a first node in the network. The device matches the anomaly data to threat intelligence feed data from one or more threat intelligence services. The device determines whether to provide threat intelligence feedback to the first node based on the matched threat intelligence feed data and one or more policy rules. The device provides threat intelligence feedback to the first node regarding the matched threat intelligence feed data, in response to determining that the device should provide threat intelligence feedback to the first node.

20 Claims, 10 Drawing Sheets

(56) References Cited

U.S. PATENT DOCUMENTS

2015/0163121 A1* 6/2015 Mahaffey ............ G06F 11/0766
   707/687
2016/0044055 A1* 2/2016 Wittenschlaeger ... G06F 21/552
   726/23

OTHER PUBLICATIONS

Nasr et al. "An Intrusion Detection and Prevention System based on Automatic Learning of Traffic Anomalies" I. J. Computer Network and Information Security; 2016; pp. 1-8.
Alex Pinto "From Threat Intelligence to Defense Cleverness: A Data Science Approach" MLSec—Machine Learning Security; pp. 1-49.

* cited by examiner

DISTRIBUTED FEEDBACK LOOPS FROM THREAT INTELLIGENCE FEEDS TO DISTRIBUTED MACHINE LEARNING SYSTEMS

RELATED APPLICATION

This application claims priority to U.S. Provisional Application No. 62/313,483, filed on Mar. 25, 2016, entitled INTERFACING MACHINE LEARNING SYSTEMS WITH EXTERNAL SECURITY SYSTEMS, by Vasseur, et al., the contents of which are incorporated herein by reference.

TECHNICAL FIELD

The present disclosure relates generally to computer networks, and, more particularly, to distributed feedback loops from threat intelligence feeds to distributed learning systems.

BACKGROUND

Anomaly detection is an important tool to assess the behavior of a communication network. In general, anomaly detection techniques seek to identify network behaviors that deviate from the pattern of normal network behavior. For example, if a given host in the network that does not normally receive a high volume of traffic suddenly begins to experience a high volume of traffic, an anomaly detection mechanism in the network may flag this condition as anomalous.

One prominent application of anomaly detection is the detection of network attacks. For example, anomaly detectors are potentially able to detect zero-day attacks. These types of attacks are so-named because of their root cause: the exploitation of a previously unknown vulnerability in the network. Notably, once the vulnerability is detected, the responsible entity has zero days to correct or mitigate the vulnerability in the network. Since zero-day attacks are, by their very nature, of an unknown type until they occur, anomaly detectors are well suited to detect their presence by identifying behavioral changes in the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
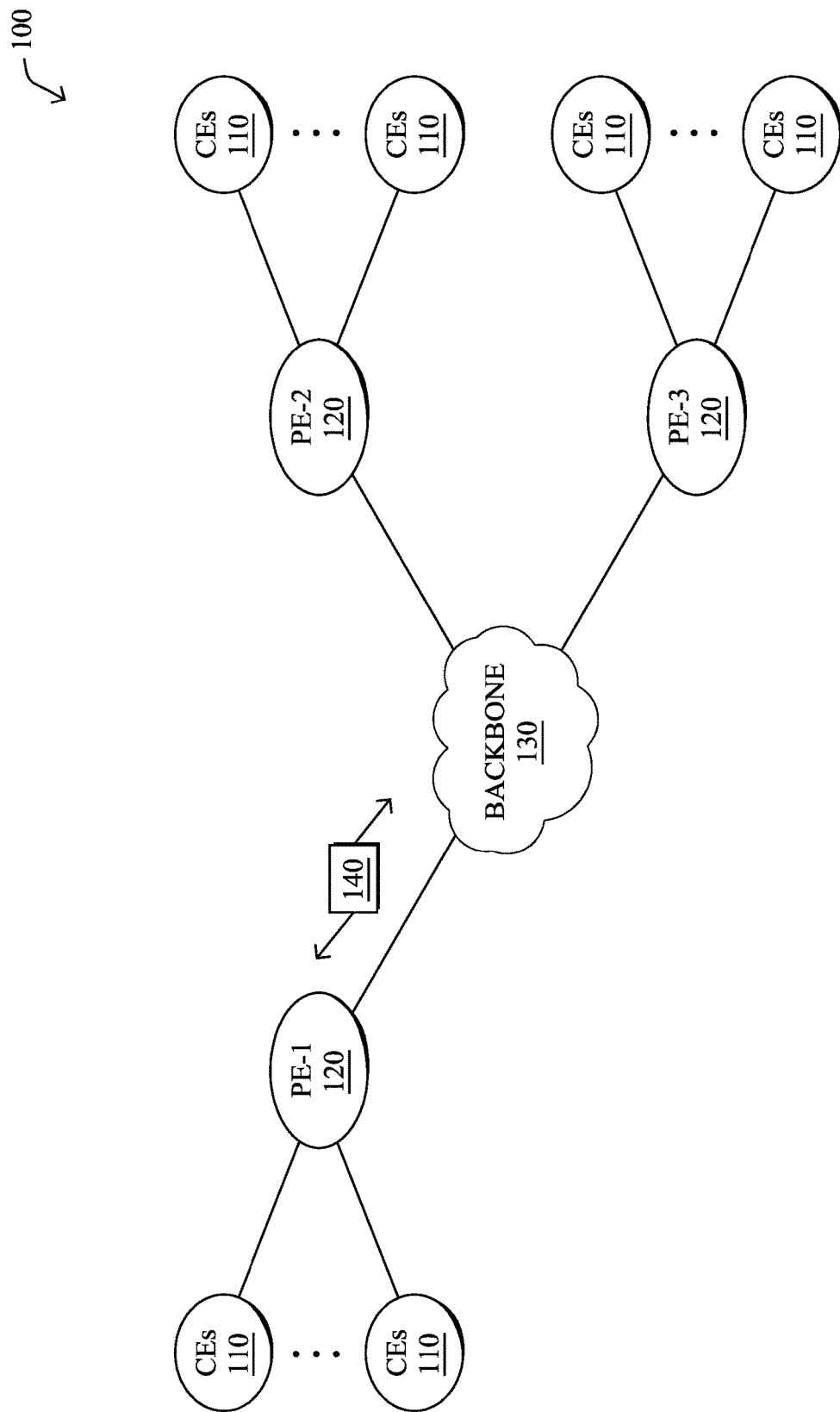
FIGS. 1A-1B illustrate an example communication network.

According to one or more embodiments of the disclosure, a device in a network receives anomaly data regarding an anomaly detected by a machine learning-based anomaly detection mechanism of a first node in the network. The device matches the anomaly data to threat intelligence feed data from one or more threat intelligence services. The device determines whether to provide threat intelligence feedback to the first node based on the matched threat intelligence feed data and one or more policy rules. The device provides threat intelligence feedback to the first node regarding the matched threat intelligence feed data, in response to determining that the device should provide threat intelligence feedback to the first node.

In further embodiments, a node in a network detects a network anomaly by analyzing network traffic using a machine learning-based anomaly detection mechanism. The node reports the detected network anomaly to a supervisory device. The node receives threat intelligence feedback from the supervisory device regarding the detected anomaly. The node adjusts an operation of the anomaly detection mechanism based on the received threat intelligence feedback.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
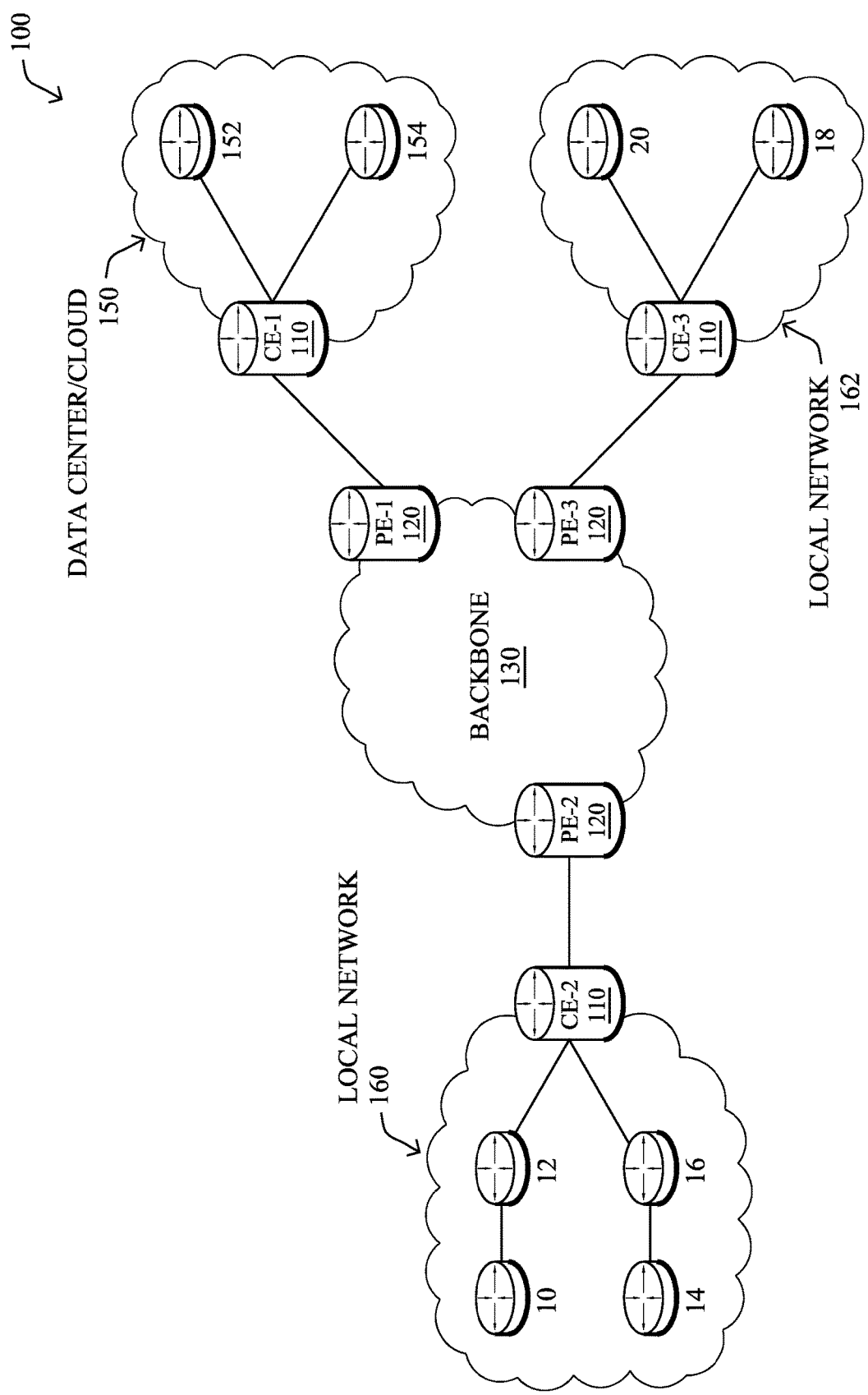

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
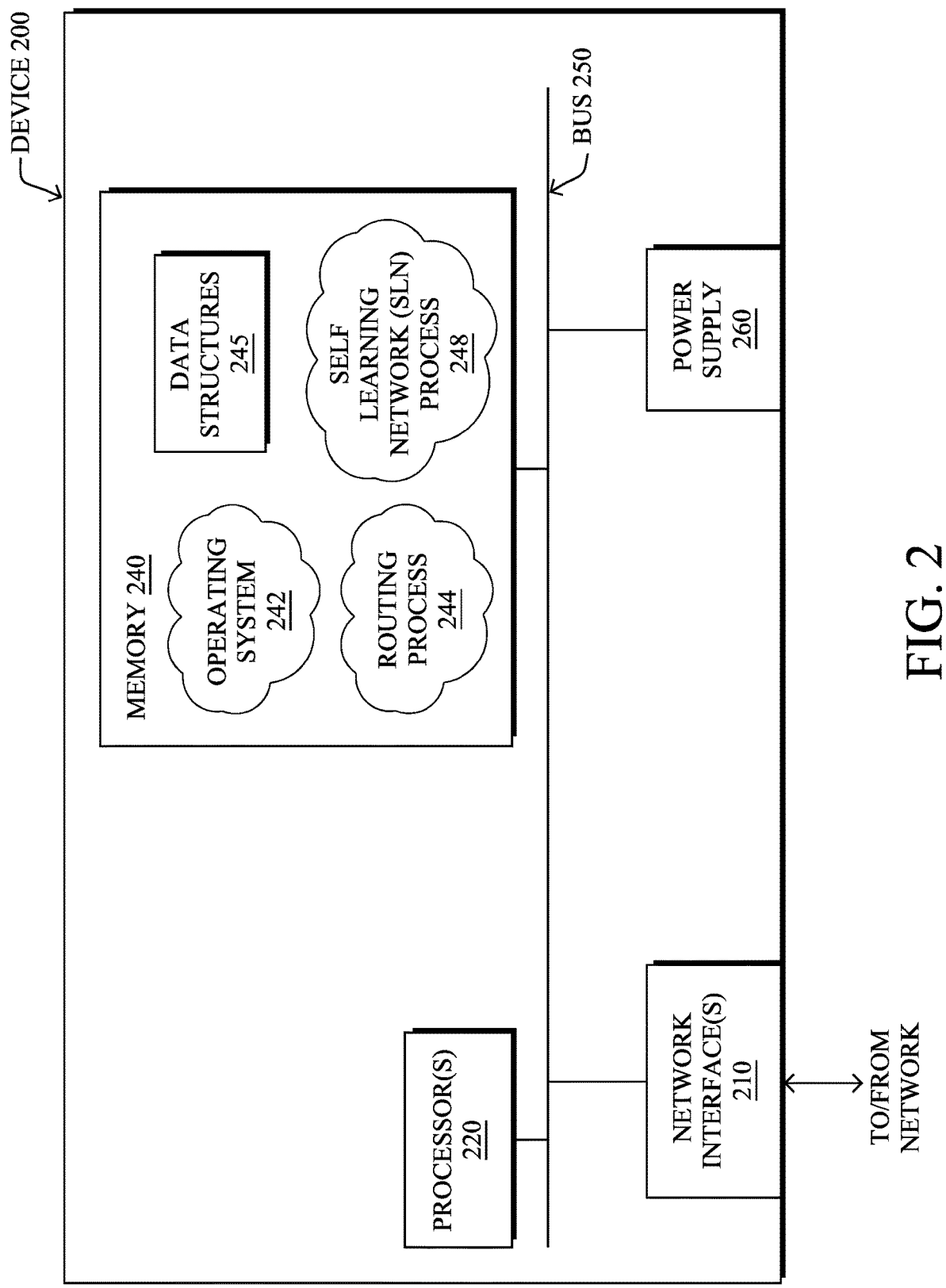
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidean distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
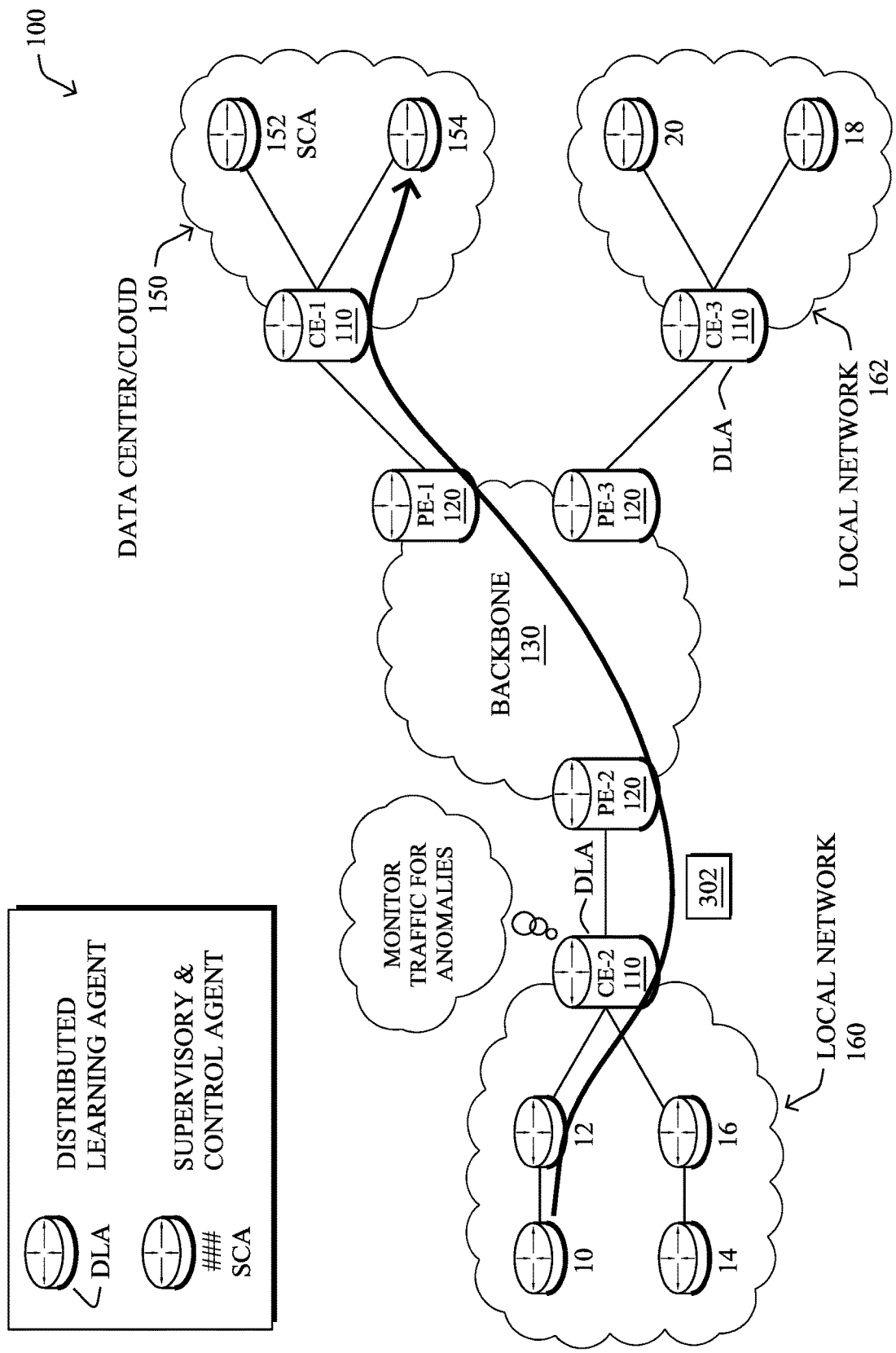
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
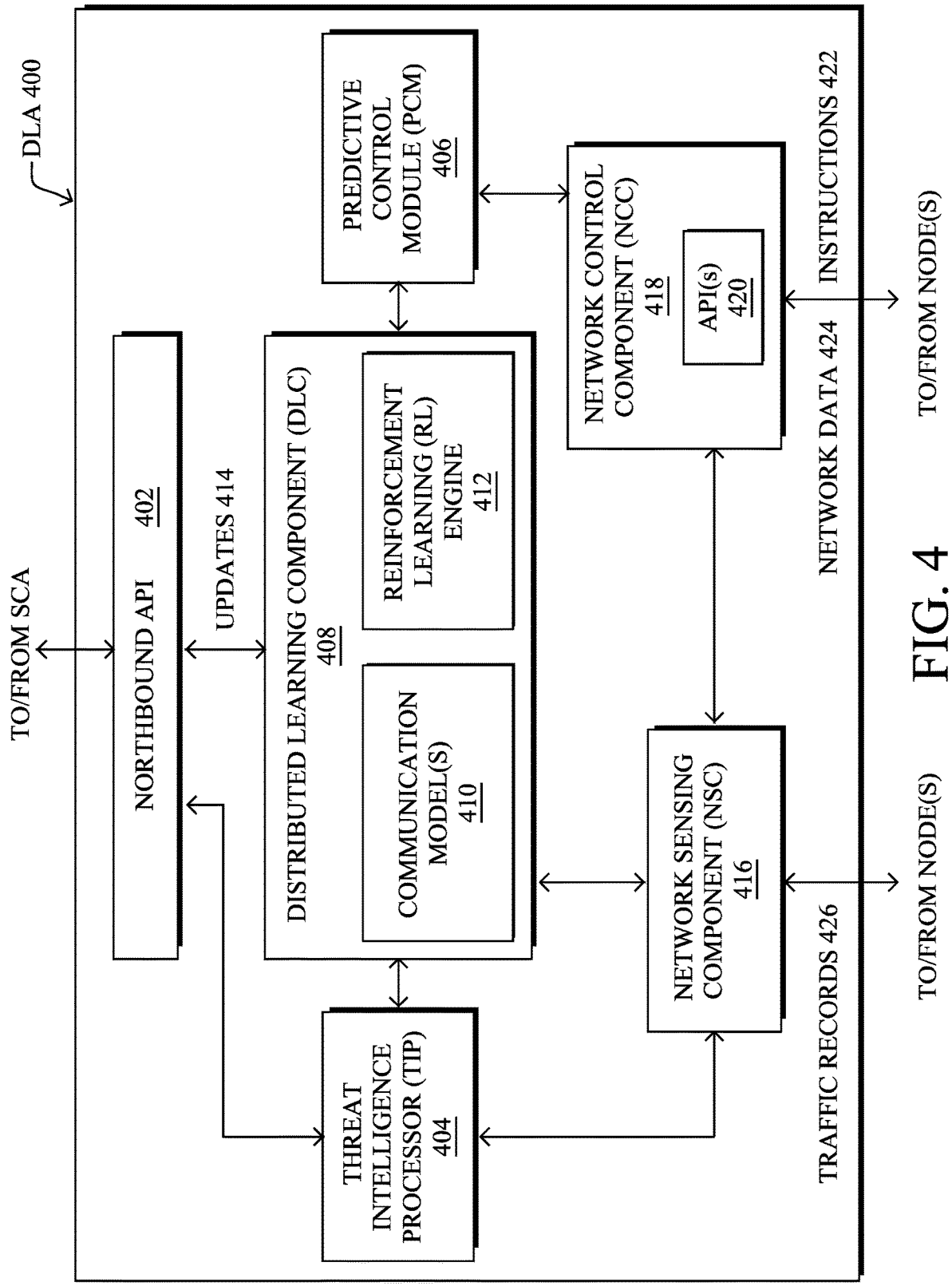
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feedback loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, a DLA may leverage unsupervised machine learning, to detect anomalous network behavior. This is in contrast to other techniques, such as signature-based approaches, that instead attempt to match an observed network behavior to a known pattern of interest (e.g., a known attack pattern, etc.). While machine learning-based anomaly detectors are quite capable of identifying anomalous network behavior, the relevancy of a given anomaly may differ significantly. For example, the presence of a new, benign application in the network may alter the network behavior and trigger a detected anomaly. However, such an anomaly may be of low relevance, as the underlying cause of the anomalous behavior is benign.

In various embodiments, an anomaly detection mechanism may leverage threat intelligence, to provide context to a detected anomaly. Notably, a number of threat intelligence platforms/services have been developed over the past few years, such as OpenDNS, Talos, Web-Based Reputation Scores (WBRS), and ThreatGrid, all available from Cisco Systems, Inc. of San Jose, Calif. These and similar platforms provide several services in order to retrieve index of compromise (IOC)-relevant threat contexts. For example, OpenDNS provides an IP address lookup service to retrieve information such as any current association with threats, historical associations to domains, autonomous system number (ASN) details, etc. Likewise, Talos provides continually updated universal resource locator (URL) and IP blacklists based on thousands of sensors located throughout the world. In another example, WBRS provides web reputation and web categorization information based on domain names and IP addresses. Further, ThreatGrid provides several behavioral pieces of information based on sandboxing of file samples that have been submitted for analysis.

Basic implementations simply combine multiple sources of threat intelligence feed data with anomaly detection results, to provide context to the results. Indeed, combining multiple sources of information greatly help engineers in a security operating center (SoC) to determine whether a raised anomaly is of interest and should trigger remediation. For example, a suspicious flow between a source IP "S" and a destination "D" detected by an anomaly detection mechanism is of much greater interest if the destination "D" has already been flagged as suspicious by a threat intelligence service (e.g., or the IP address belongs to a suspicious autonomous system).

Distributed Feedback Loops from Threat Intelligence Feeds to Distributed Machine Learning Systems The techniques herein not only leverage threat intelligence feeds to garner context for detected anomalies, but also introduce a feedback mechanism to trigger specific actions on learning agents (e.g., DLAs), effectively interconnecting both platforms. Said differently, the techniques herein provide for the joining of machine learning-based anomaly detection mechanisms trained at the network edge with threat intelligence feed data collected centrally (e.g., at an SCA or other supervisory device). A centralized agent aggregates several sources of threat intelligence feeds and selectively sends downstream signals to the DLAs. In turn, the receiving DLA(s) may use these signals to adjust their behaviors (e.g., to favor anomalies that match characteristics/patterns reported by threat intelligence services).

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Specifically, in various embodiments, a device in a network receives anomaly data regarding an anomaly detected by a machine learning-based anomaly detection mechanism of a first node in the network. The device matches the anomaly data to threat intelligence feed data from one or more threat intelligence services. The device determines whether to provide threat intelligence feedback to the first node based on the matched threat intelligence feed data and one or more policy rules. The device provides threat intelligence feedback to the first node regarding the matched threat intelligence feed data, in response to determining that the device should provide threat intelligence feedback to the first node.

Figure 5:
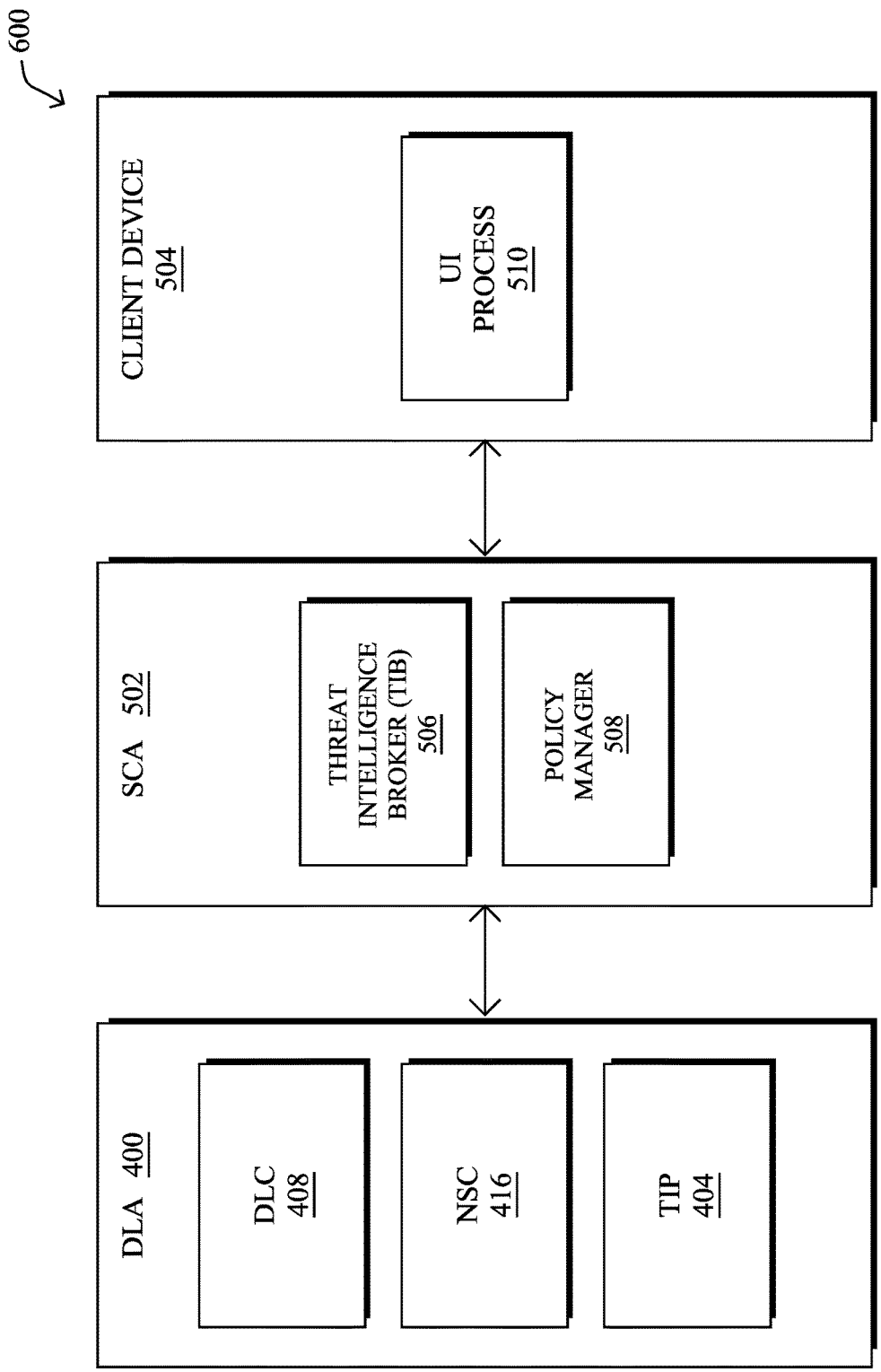
FIG. 5 illustrates an example architecture for implementing a threat intelligence feedback loop in an SLN.

Operationally, FIG. 5 illustrates an example architecture 500 for implementing a threat intelligence feedback loop in an SLN, according to various embodiments. One aspect of the techniques herein illustratively involve a remote learning agent that is equipped with an anomaly detection engine, such as DLA 400 shown. Notably, the anomaly detection engine (e.g., DLC 408) may use a set of machine learning models, to detect anomalies at the edge of a local network. For example, DLC 408 may employ an unsupervised machine learning-based anomaly detector that identifies statistical deviations in the characteristics of the network traffic. DLA 400 may also employ a traffic capture mechanism (e.g., NSC 416, etc.) that is in charge of dynamically capturing traffic data 506 of interest. Further, as described above, DLA 400 may execute a TIP 404 that assesses the relevancy of any anomalies that DLC 408 detects.

As described above, architecture 500 may also include an SCA 502 that provides supervisory control over DLA 400 and receives notifications of any anomalies detected by DLA 400. For example, SCA 502 may receive administrative commands and/or parameters from a user interface (UI) process 510 executed by client device 504 or directly on SCA 502. Notably, SCA 502 may generate visualizations for display by UI process 510, thereby allowing an administrator or other user to review the anomaly detection mechanisms in the network. In response, the user may provide feedback regarding any detected anomalies to DLA 400 via SCA 502.

In various embodiments, and as described in greater detail below, SCA 502 may execute a threat intelligence broker (TIB) 506 configured to form a feedback control loop with DLA 400 (e.g., TIP 404) based on threat intelligence feed data from any number of threat intelligence services. SCA 502 may also include a policy manager 508 that operates in conjunction with TIB 506, to control when and how SCA 502 provides threat intelligence feedback to DLA 400 regarding a detected anomaly.

Figure 6:
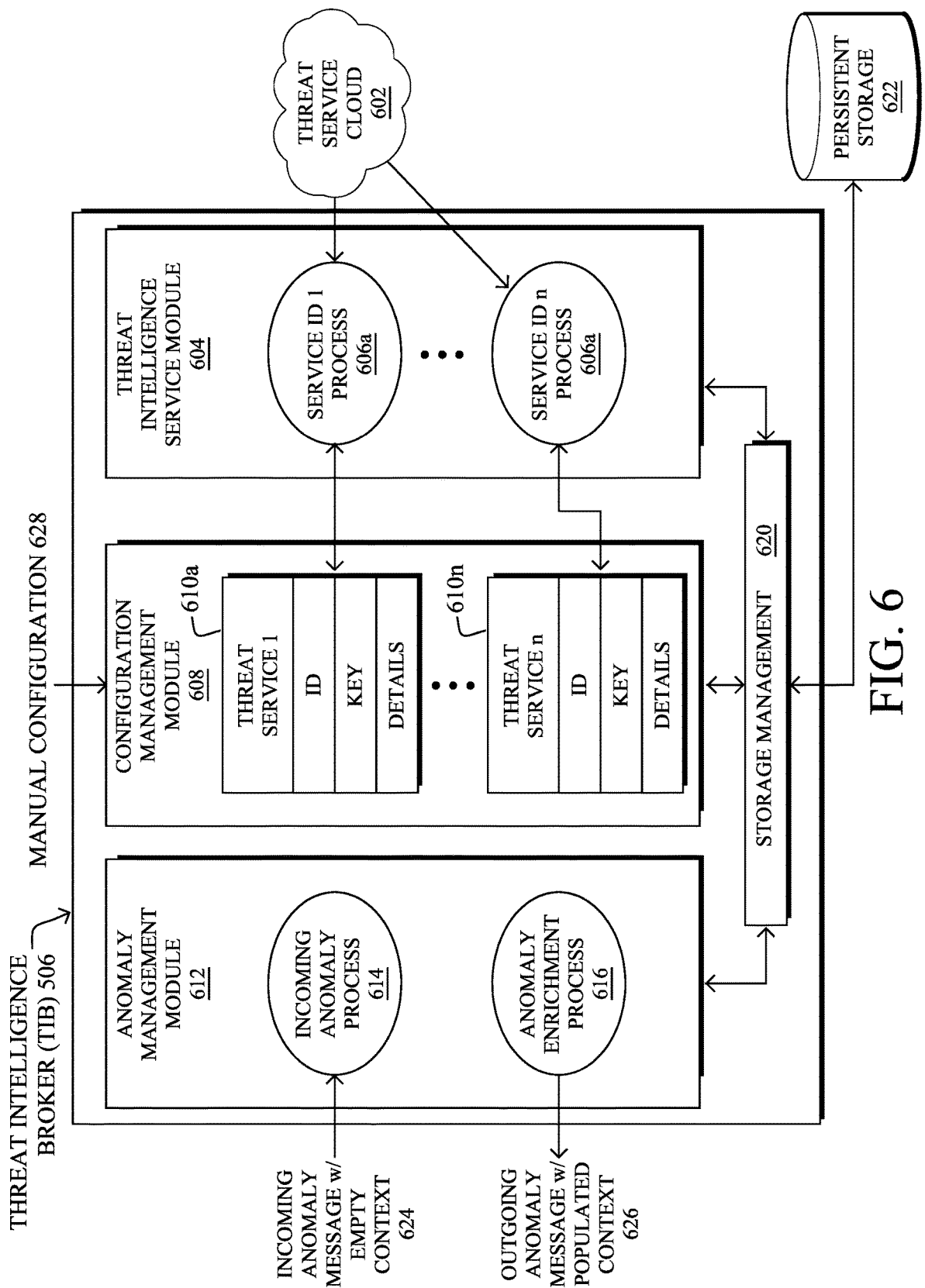
FIG. 6 illustrates an example threat intelligence broker.

FIG. 6 illustrates an example implementation of threat intelligence broker (TIB) 506, according to various embodiments. In general, TIB 506 may be hosted on a central controller (e.g., SCA 502) and is in charge of retrieving threat intelligence feed data thanks to unsolicited and/or solicited requests. Notably, TIB 506 may receive threat intelligence feed data from any number of threat intelligence services collectively represented in FIG. 6 as a threat service cloud 602.

As shown, TIB 506 may include a threat intelligence service module 604 that includes any number of service processes 606a-606n (e.g., a first through $n^{th}$ service process). Each of service processes 606a-606n may provide an interface with a corresponding threat intelligence service in threat service cloud 602. For example, services 606a-606n may request threat intelligence feed data from threat service cloud 602 and/or may receive threat intelligence feed data that is pushed to TIB 508.

TIB 506 may also include a configuration management module 608 that is configured to configure TIB 506 to interface with the threat intelligence services in cloud 602. For example, configuration management module 608 may translate manual configuration data 628 (e.g., received via UI process 510) into configurations 610a-610n (e.g., a first through $n^{th}$ configuration) for the corresponding services and service processes 610a-610n. For example, each configuration 610 may identify the particular threat intelligence service, unique identifiers (ID s) associated with the service, threat keys, threat detail information, and the like.

TIB 506 may further include one or more storage management processes 620 configured to store any of the received data in persistent storage 622 (e.g., a persistent memory of SCA 502). For example, TIB 506 may store threat intelligence feed data in storage 622 for further use.

Likewise, TIB 506 may store any reported anomaly messages 624 received by SCA 502 from the remote DLAs 400.

In various embodiments, TIB 506 may also include an anomaly management module 612 configured to form a feedback control loop with the DLAs 400 that SCA 502 oversees. In some implementations, anomaly management module 612 may comprise an incoming anomaly process 614 configured to receive and assess the incoming anomaly messages 624 from the DLAs. As noted above, anomaly messages 624 may not include any context regarding a detected anomaly. Anomaly management module 612 may further comprise an anomaly enrichment process 616 configured to selectively provide messages 626 as feedback to the detecting DLAs based on the associated threat intelligence feed data from threat service cloud 602. Messages 626 may, as detailed below, include threat intelligence data as context for the destination DLA(s). In turn, a receiving DLA may adjust the operation of its anomaly detection mechanism, accordingly.

Referring again to FIG. 5, one aspect of the techniques herein is policy manager 508 which is hosted on the controller (e.g., SCA 502) and collocated with TIB 506. In various embodiments, policy manager 508 may manage policies related to the downstream signals (e.g., messages 626) sent from the threat intelligence mechanism to the machine learning based anomaly detection mechanisms of the DLAs. In various embodiments, these downstream signals are messages sent by SCA 502 and are configured to trigger specific control loop actions by the machine learning-based anomaly detection mechanism of the DLAs.

Policy manager 508 may enforce policies that are based on a rule-based system specifying the set of actions (e.g., send a downstream signal/message 626) that must be triggered upon detecting a specific threat intelligence event. For example, policy manager 508 may request the sending of a signal to all remote agents upon detecting any of the following: the reputation of a specific URL has crossed some threshold, the index of compromise (IOC) of an autonomous system (AS) is dangerously decreasing, a specific IP block address is marked as potentially hosting some compromised hosts/botnets, etc. Such rules may be dynamically built using input from UI process 510, which may be located remotely on client device 504 or located directly on SCA 502, or from a security information and event management (SIEM) mechanism when proposing the threat intelligence threats. It should be noted that these rules do not need explicit endpoints specified but instead may be based on metadata that capture characteristics of the threat against which modifications need to be done in the machine learning mechanisms.

Said differently, a key function of policy manager 508 is to specify all rules that, if met, trigger a signal back to the DLA(s) to modify their machine learning-based anomaly detection mechanisms. All rules are then stored (e.g., in persistent storage 622), in order to be potentially removed by the user, as desired.

In various embodiments, TIB 506 and policy manager 508 may work in conjunction with one another to detect the events that match the specific rules of policy manager 508 and send a feedback signal to the DLA. Since IOCs (e.g., malware signatures, IP addresses, ASN, URL, domain names, etc.) in the threat intelligence feed data do not yet conform with a unified data scheme, TIB 506 may perform a local mapping among the threat intelligence feed data, to provide a unified data format for the feedback signals sent to the DLAs. In addition, SCA 502 may perform network-based processing (e.g., by calling an API such as a topology manager), to add context to the feedback signal.

For example, should TIB 506 receive an IOC related to AS "X," it may be useful to perform a BGP lookup to retrieve the set of addresses advertised for the AS and add this information to the feedback message(s) sent to the DLA(s). For example, after identifying the DLAs that are exposed to the advertised addresses, SCA 502 may send the feedback signals/messages to the identified DLAs. In another embodiment, TIB 506 may determine which DLAs are related to the IOC (e.g., by looking at their traffic destined to suspicious addresses). Furthermore, TIB 506 may trigger additional processing locally, to introduce additional analytics such as IOC trending for the particular characteristic (e.g., AS reputation, malware impact, etc.). In one embodiment, TIB 506 may use one or more time series related to a variable such as a URL reputation scores received by TIB 506 and, if such a score crosses a predefined threshold for a defined rule, send a downstream signal to the DLA(s).

In some embodiments, TIB 506 may also be configured to upload captured packets in message 624 to one or more of the services in threat service cloud 602. Notably, there may be some threat intelligence feeds that first require anomaly data to be uploaded from the anomaly detection system to an external threat intelligence service for additional forensics. Such a service may also store the sampled packets as infected/anomalous samples which can be used later on for purposes of comparison when other anomalies arise.

Figure 7A:
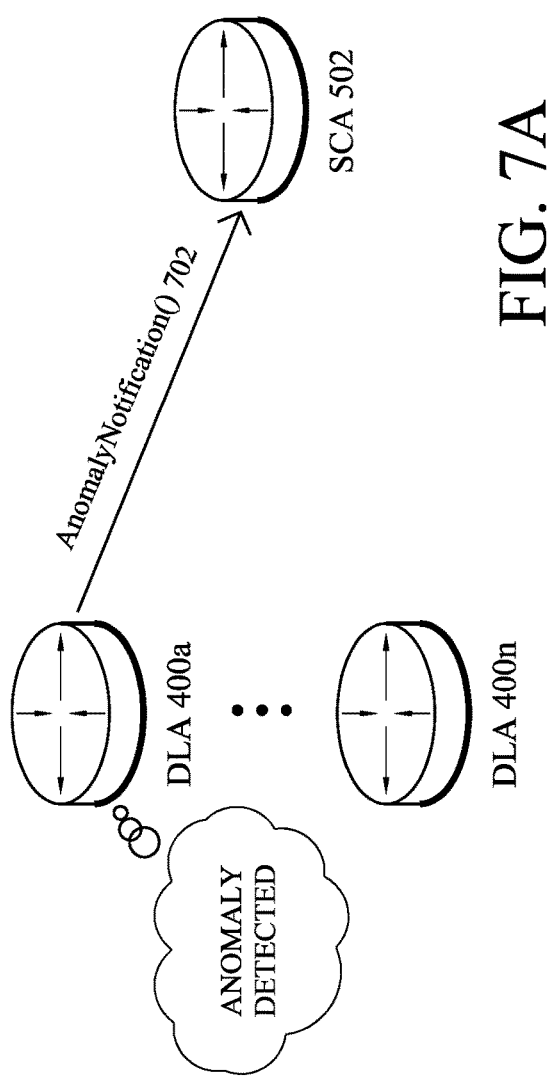
FIGS. 7A-7D illustrate an example threat intelligence feedback loop in an SLN.

FIGS. 7A-7D illustrate an example threat intelligence feedback loop in an SLN, in accordance with various embodiments. As shown in FIG. 7A, assume that SCA 502 provides supervisory control over any number of DLAs 400a-400n (e.g., a first through $n^{th}$ DLA 400) and is in communication with threat service cloud 602. In other words, SCA 502 may subscribe to any number of threat intelligence services (e.g., cloud-based services).

In FIG. 7A, assume that DLA 400a detects an anomalous condition using its local anomaly detector. For example, DLA 400a may analyze traffic data regarding its local network using an unsupervised, machine learning-based anomaly detection mechanism. If the assessed traffic is statistically anomalous, DLA 400a may flag the anomalous condition and report the anomaly to SCA 502 via an AnomalyNotification( ) message 702. As noted above, message 702 may include any or all information regarding the analyzed features that gave rise to the detected anomaly. For example, message 702 may indicate the source and/or destination addresses of the anomalous traffic, the protocol(s) used by the traffic, an identified application associated with the traffic, etc.

Figure 7B:
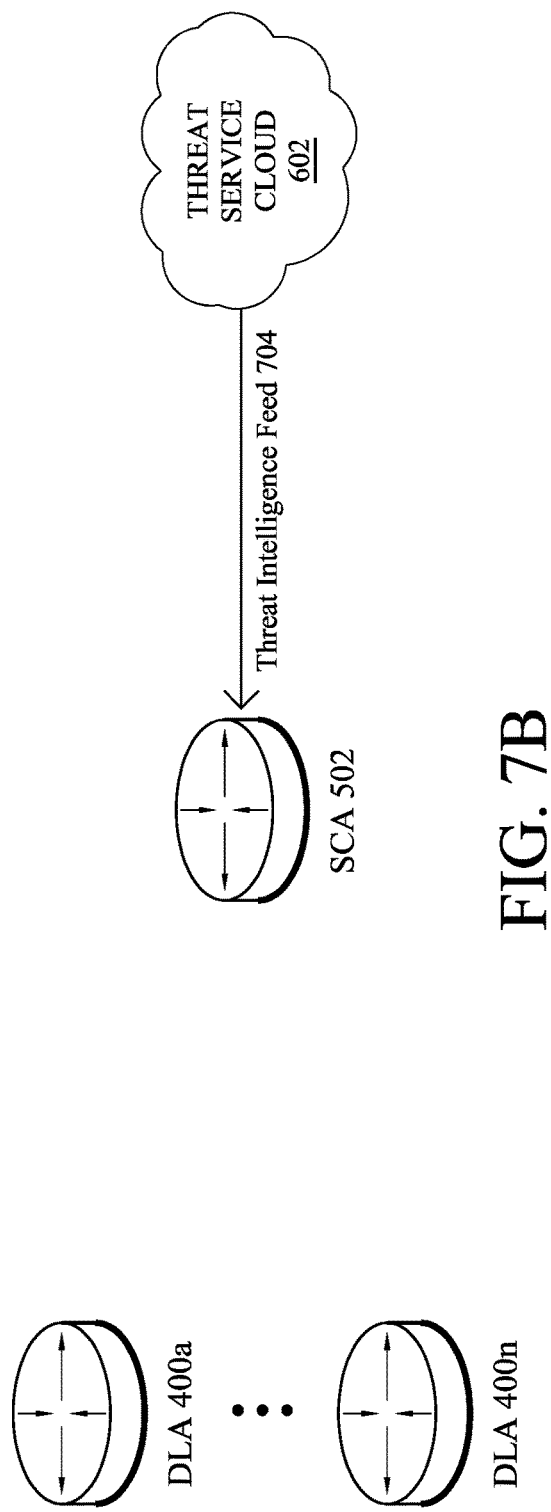

In FIG. 7B, SCA 502 may receive a threat intelligence feed 704 from threat service cloud 602. In some embodiments, SCA 502 may request threat intelligence feed 704 based on AnomalyNotification( ) message 702. For example, SCA 502 may perform a lookup of one or more of the addresses indicated in message 702. In other embodiments, the corresponding service(s) in threat service cloud 602 may push threat intelligence feed 704 to SCA 502 at specific times. In turn, SCA 502 may store the threat intelligence feed data for later use. Threat intelligence feed 704 may, for example, identify one or more network addresses, threat levels associated with the addresses, applications or protocols associated with the addresses, etc.

Figure 7C:
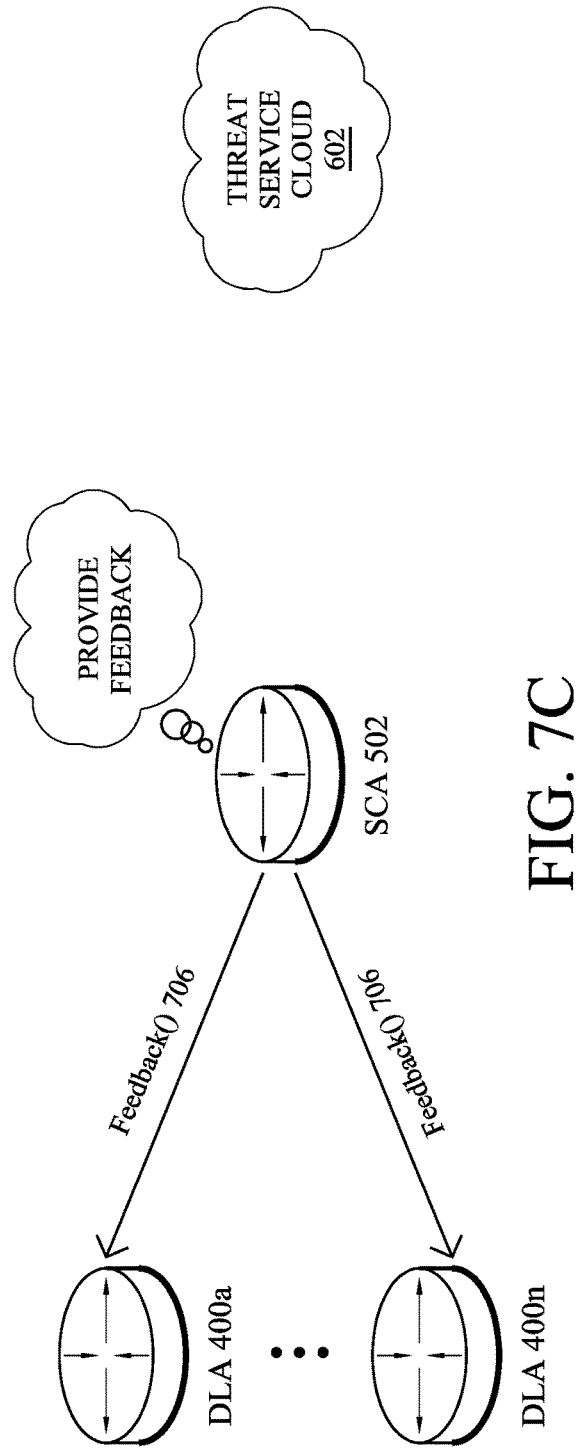

In FIG. 7C, SCA 502 may match the information regarding the detected anomaly to the threat intelligence feed data. In some embodiments, SCA 502 may determine whether or not to provide feedback to DLA 400*a* and/or any of the other DLAs. For example, if the threat score(s) in the corresponding threat intelligence feed data are below a threshold, SCA 502 may determine that feedback is not needed. However, if SCA 502 determines that DLA 400*a* and/or any of the other DLAs should alter its anomaly detection mechanism (e.g., based on the matched threat intelligence feed data and local policy rules of SCA 502), SCA 502 may send a Feedback( ) message 706 to the selected DLA(s).

In some embodiments, Feedback( ) message 706 may be a downstream signal that has a unified format (e.g., unified across the different types of threat intelligence services). For example, message 706 may have the following format:

```
struct DownstreamSignal {
    string resource_type, // this can be 'AS', 'IP', 'URL', etc,.
    string resource_uid, // unique identifier of the resource
    string threat_type, // the name of the malware/attack/threat
    double threat_level // normalized threat level
}
``` where resource_type is the type of resource concerned by the signal (e.g., an autonomous system, an IP address, a URL), resource_uid is the unique identifier of this resource (whose format depends on resource), threat_type is the type of threats (e.g., a specific malware, attack or threat), and threat_level is a value that indicates the level of threat.

Figure 7D:
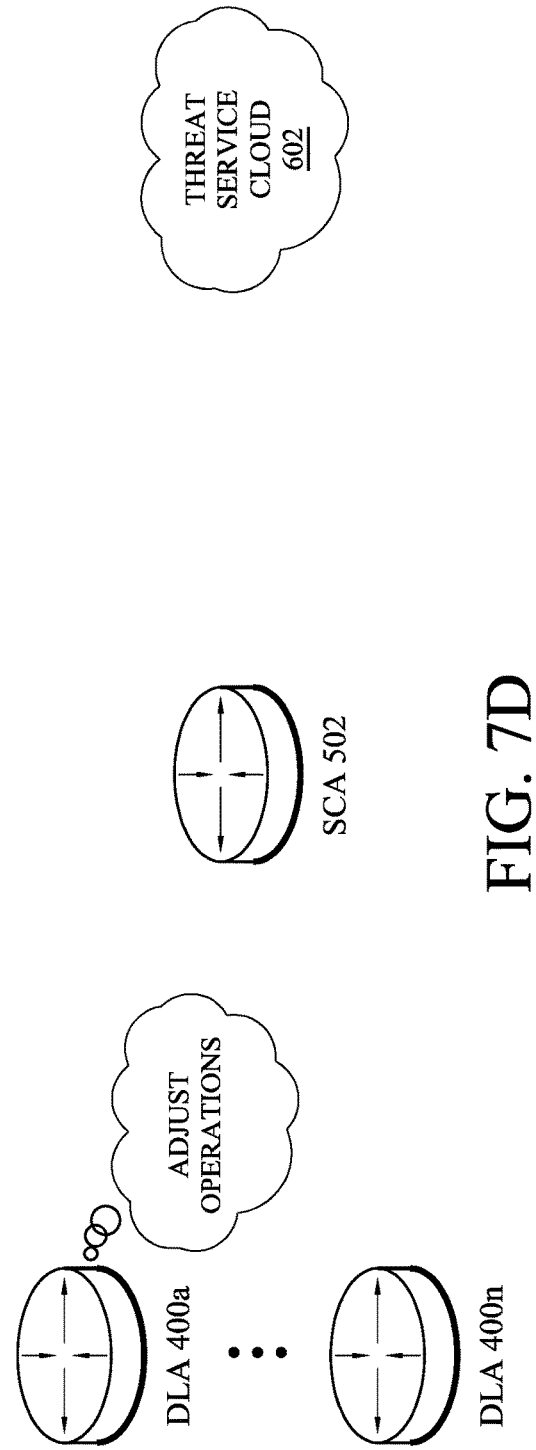

In FIG. 7D, in response to receiving a signal via Feedback( ) message 706, the receiving DLA may adjust its operations by taking any of several actions. In one embodiment, the receiving DLA may store the signal in a local database, which is then used to favor anomalies that match one of the signals (either through a boosting of their score by a factor proportional to the threat level). For instance, assume that the DLA receives the following Feedback( ) message 706:

```
{
    'resource_type' : 'IP',
    'resouce_uid' : '14.24.34.12',
    'threat_type' : 'scanner',
    'threat_level' : 2.34
}
```

In such a case, the receiving DLA may adjust its operation such that any anomaly involving 14.24.34.12 is favored by a factor 2.34.

In another embodiment, the DLA may incorporate this information as a feature for the estimation of the relevance to the user. For example, TIP 404 may use the received feedback to adjust the relevance score for any anomalies that involve the identified devices, networks, etc. in the feedback.

In yet another embodiment, the downstream signal may be used to bypass a local filter used for dropping anomalies that were classified as potentially non relevant. For example, assume that DLA 400*a* uses a filter that would otherwise suppress an anomaly message regarding traffic to 14.24.34.12, but that the feedback indicates a relatively high threat level. In such a case, DLA 400*a* may nonetheless bypass this filter and report anomalies involving this address to SCA 502, when detected.

In a further embodiment, the receiving DLA may also store the feedback signal in a local database in order to construct new features used for anomaly detection (e.g., the cumulative threat level for a particular conversation, the average reputation of DNS request for a particular host, etc.).

In an additional embodiment, the DLA may trigger the creation of dedicated clusters based on the feedback signals. For instance, all hosts that are associated to the threat type 'scanner' may be clustered together. If an autonomous system has a large threat level, all corresponding IP addresses maybe clustered together, as well.

The impact of a particular threat intelligence feed/source can be dynamically increased based on the historical contribution to the modification of the machine learning processes. For example, if a certain feed provides a kind of information, such as reputation or URLs, that often results in rules being matched by hosts, then it could be given more importance over other feeds which have had much lesser impact on the processes. This will also allow the tracking of highest contributors from the threat aspect to the machine learning processes.

Figure 8:
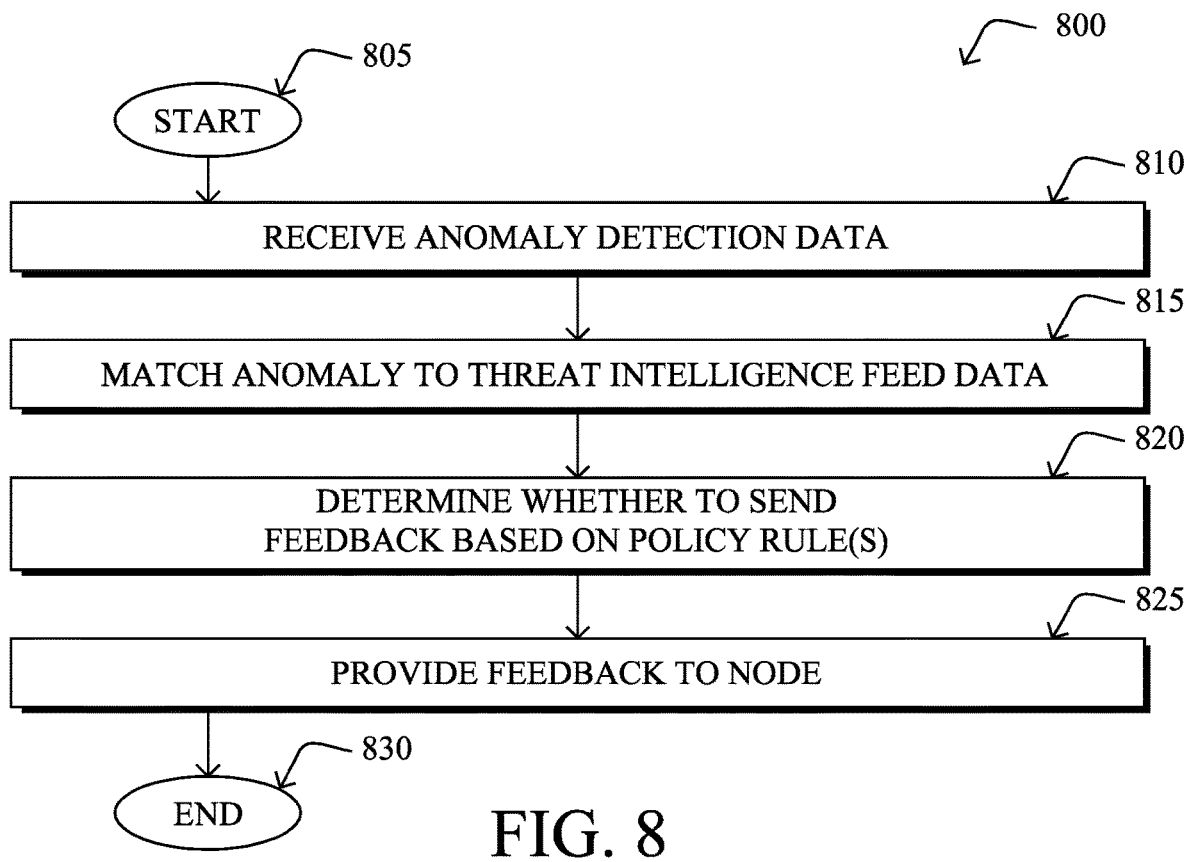
FIG. 8 illustrates an example simplified procedure for providing threat intelligence feedback.

FIG. 8 illustrates an example simplified procedure for providing threat intelligence feedback, in accordance with various embodiments herein. Procedure 800 may be performed, for example, by a specialized device in a network, such as an SCA or other device that provides supervisory control in a network. Procedure 800 may start at step 805 and continues on to step 810 where, as described in greater detail above, the device may receive anomaly detection data regarding a detected anomaly in the network. For example, in some cases, the device may receive the anomaly detection data from another node in the network (e.g., a DLA, etc.) that executes a machine learning-based anomaly detection mechanism. If such a node detects an anomalous condition, it may send data regarding the anomaly to the device (e.g., the devices, protocols, applications, etc., involved in the anomaly).

At step 815, as detailed above, the device may match the anomaly data to threat intelligence feed data from one or more threat intelligence services. In some embodiments, the device may use the anomaly data to request threat intelligence feed data regarding one or more addresses, networks, systems, protocols or applications, etc., associated with the anomaly. In further embodiments, the device may already have access to such feed data, such as from a local store. In various embodiments, the threat intelligence feed data may indicate one or more of: a resource type, a unique resource identifier, a threat type, or a threat level, based on the match.

At step 820, the device may determine whether to send feedback to the detecting node based on one or more policy rules, as described in greater detail above. For example, the device may only elect to send feedback when the threat intelligence feed data indicates a potential threat above a certain threshold. In further examples, the device may determine that feedback is needed if the reputation of a specific URL has crossed some threshold, the IOC of an AS is dangerously decreasing, a specific IP block address is marked as potentially hosting some compromised hosts/botnets, etc.

At step 825, as detailed above, the device may provide the threat intelligence feedback to the node and/or one or more other anomaly detection nodes in the network. In general, such feedback may be based on the threat intelligence feed data matched to the anomaly and provided in a uniform manner. For example, the feedback may indicate a resource type, a unique resource identifier, a threat type, or a threat level, based on the anomaly data. In various embodiments, the feedback may be configured to cause the receiving node(s) to adjust their anomaly detection mechanisms (e.g., by bypassing a reporting filter, adjusting an anomaly or relevancy score, adjusting the anomaly detector itself, etc.). Procedure 800 then ends at step 830.

Figure 9:
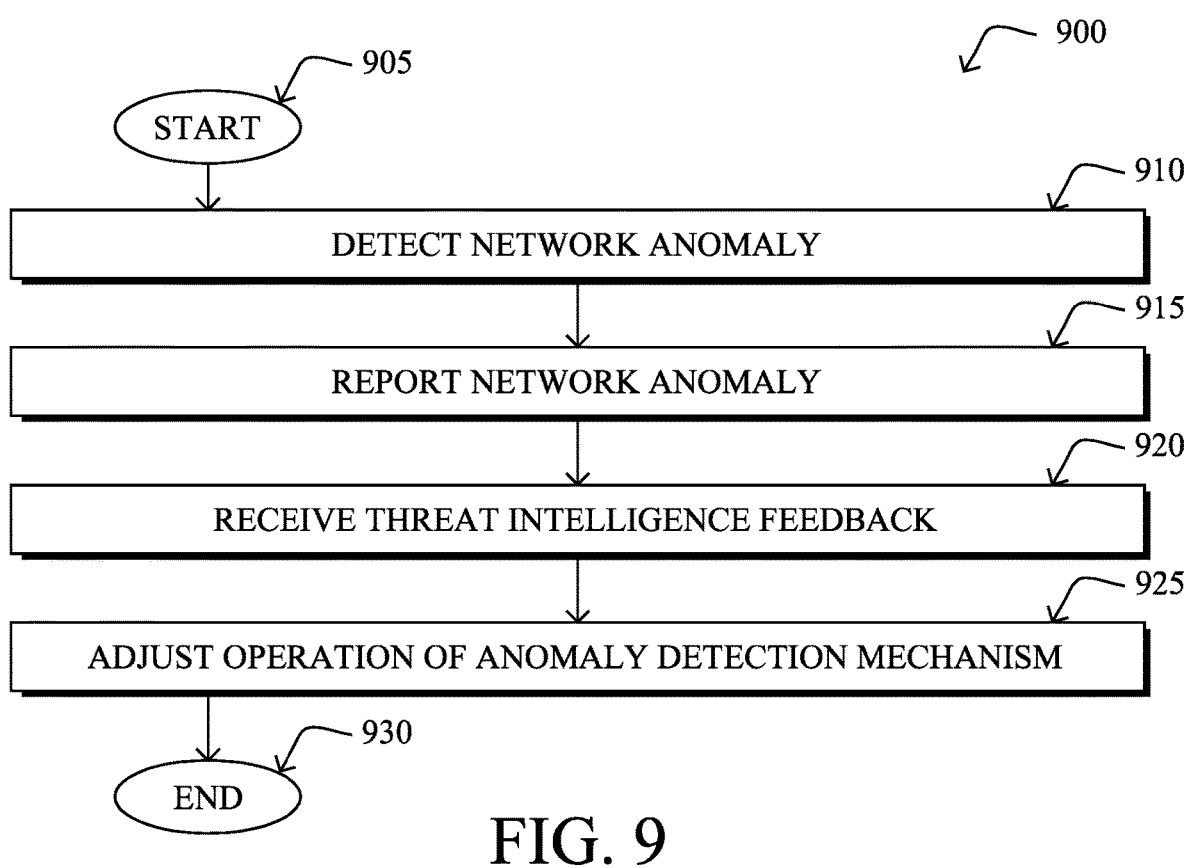
FIG. 9 illustrates an example simplified procedure for adjusting an anomaly detection mechanism based on threat intelligence feedback.

FIG. 9 illustrates an example simplified procedure for adjusting an anomaly detection mechanism based on threat intelligence feedback, in accordance with various embodiments. Generally, procedure 900 may be performed by a specialized node in a network configured to detect network anomalies. Procedure 900 may start at step 905 and continue on to step 910 where, as described in greater detail above, the node may detect a network anomaly. In some embodiments, the node may execute an unsupervised machine learning-based anomaly detector, to determine whether sensed network conditions are anomalous.

At step 915, as detailed above, the node may report the detected anomaly to a supervisory device, such as an SCA or the like. In various embodiments, the reported anomaly may include any or all information available regarding the anomaly. For example, the node may send a message that indicates the endpoints of anomalous traffic, timing information regarding the traffic, protocols and/or applications associated with the traffic, etc.

At step 920, the node may receive threat intelligence feedback from the supervisory device, as described in greater detail above. In various embodiments, the threat intelligence feedback may include threat intelligence feed data from one or more threat intelligence services regarding the detected anomaly. For example, if the anomaly involves a specific URL, the feedback may include a reputation score for the URL from the one or more threat intelligence services.

At step 925, as detailed above, the node may adjust an operation of its anomaly detection mechanism, based on the received feedback. In some embodiments, the node may adjust an anomaly relevancy score for any anomalies related to the feedback. For example, if the feedback indicates a high IOC for a traffic endpoint, the node may increase the relevancy score for anomalies involving this endpoint, accordingly. In another embodiment, the node may bypass a reporting filter used by the node to suppress anomaly reporting, based on the feedback. In a further embodiment, the node may adjust a cluster of hosts/systems assessed by the node. In yet another embodiment, the node may adjust its machine learning-based anomaly detector (e.g., the set of features used by the detector, etc.). Procedure 900 then ends at step 930.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide for distributed feedback loops from threat intelligence feeds to distributed machine learning systems. In particular, the techniques herein will drastically improve the accuracy and relevance of anomalies reported by anomaly detection systems, such as an SLN, while retaining the key advantages of such systems over centralized anomaly detection systems (e.g., the use of DPI features, scalability, small impact on network resources, etc.). Note that in contrast to merely using a threat intelligence feed in an anomaly detection systems for context enrichment, the techniques herein further propose the real-time triggering of modification/adjustments to the deployed anomaly detection mechanisms.

While there have been shown and described illustrative embodiments that provide for distributed feedback loops from threat intelligence feeds to distributed machine learning systems or for a network-based approach for training supervised learning classifiers, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, at a supervisory device that is centrally located in a network, a notification from a distributed learning agent among a plurality of distributed learning agents located at an edge of the network, the notification identifying an anomaly which has been detected by the distributed learning agent, wherein the distributed learning agent detects the anomaly at the edge of the network using a locally executed machine learning-based anomaly detector configured to identify statistical deviations in characteristics of network traffic at the distributed learning agent;

receiving, at the supervisory device, threat intelligence feed data from one or more threat intelligence services;

matching, by a threat intelligence broker on the supervisory device, the anomaly detected by the distributed learning agent to the threat intelligence feed data;

determining, by the supervisory device, whether to provide threat intelligence feedback to the distributed learning agent based on the matched threat intelligence feed data and one or more policy rules; and providing, by the supervisory device, threat intelligence feedback to the distributed learning agent regarding the matched threat intelligence feed data, in response to determining that the device should provide threat intelligence feedback to the distributed learning agent, wherein the providing of the threat intelligence feedback from the supervisory device that is centrally located in the network to the distributed learning agent that is located at the edge of the network causes the distributed learning agent to adjust an operation of the machine learning-based anomaly detector locally executing on the distributed learning agent.

2. The method as in claim 1, wherein the threat intelligence feedback includes one or more of: a resource type, a unique resource identifier, a threat type, or a threat level.

3. The method as in claim 1, wherein the threat intelligence feed data comprises a network address and a threat level associated with the network address.

4. The method as in claim 1, wherein the threat intelligence feedback is configured to cause the distributed learning agent to adjust an anomaly relevancy score used by the distributed learning agent to trigger anomaly reporting.

5. The method as in claim 1, wherein the threat intelligence feedback is configured to cause the distributed learning agent to bypass a local filter used by the distributed learning agent to suppress anomaly notifications.

6. The method as in claim 1, wherein the threat intelligence feedback is configured to cause the distributed learning agent to adjust a set of input features for the locally executed machine learning-based anomaly detector.

7. The method as in claim 1, further comprising:
providing, by the supervisory device, the threat intelligence feedback to the distributed learning agent, in response to a determination that a threat score in the matched threat intelligence feed data exceeds a threshold.

8. A method comprising:
detecting, by a distributed learning agent among a plurality of distributed learning agents located at an edge of a network, an anomaly using a locally executed machine learning-based anomaly detector configured to identify statistical deviations in characteristics of network traffic at the distributed learning agent;
sending, by the distributed learning agent, a notification identifying the anomaly to a supervisory device that is centrally located in the network;
receiving, at the distributed learning agent, threat intelligence feedback from the supervisory device regarding the anomaly, wherein the supervisory device matches the reported network anomaly to threat intelligence feed data received from one or more threat intelligence services, and wherein the threat intelligence feed data is collected by the supervisory device at a central location in the network, while the anomaly is detected at the edge of the network by the distributing learning agent; and
adjusting, by the distributed learning agent, an operation of the locally executed machine learning-based anomaly detector based on the received threat intelligence feedback.

9. The method as in claim 8, wherein the threat intelligence feedback includes one or more of: a resource type, a unique resource identifier, a threat type, or a threat level.

10. The method as in claim 8, wherein adjusting the operation of the locally executed machine learning-based anomaly detector comprises:
bypassing, by the distributed learning agent, a local filter used to suppress anomaly notifications.

11. The method as in claim 8, wherein adjusting the operation of the locally executed machine learning-based anomaly detector comprises:
adjusting, by the distributed learning agent, an anomaly relevancy score used to trigger anomaly reporting.

12. The method as in claim 8, wherein adjusting the operation of the locally executed machine learning-based anomaly detector comprises:
adjusting, by the distributed learning agent, a set of input features for the locally executed machine learning-based anomaly detector.

13. The method as in claim 8, wherein the locally executed machine learning-based anomaly detector uses unsupervised machine learning to detect the anomaly.

14. The method as in claim 8, further comprising:
grouping, by the distributed learning agent, a set of hosts for analysis by the locally executed machine learning-based anomaly detector based on the threat intelligence feedback.

15. The method as in claim 8, wherein the distributed learning agent adjusts the operation of the locally executed machine learning-based anomaly detector based in part on a history of threat intelligence feedback.

16. An apparatus, the apparatus being a supervisory device that is centrally located in a network, the apparatus comprising:
one or more network interfaces to communicate with a network;
a processor coupled to the network interfaces and configured to execute one or more processes; and
a memory configured to store a process executable by the processor, the process when executed operable to:
receive a notification from a distributed learning agent among a plurality of distributed learning agents located at an edge of the network, the notification identifying an anomaly which has been detected by the distributed learning agent, wherein the distributed learning agent detects the anomaly at the edge of the network using a locally executed machine learning-based anomaly detector configured to identify statistical deviations in characteristics of network traffic at the distributed learning agent;
receive threat intelligence feed data from one or more threat intelligence services;
match the anomaly detected by the distributed learning agent to the threat intelligence feed data;
determine whether to provide threat intelligence feedback to the distributed learning agent based on the matched threat intelligence feed data and one or more policy rules; and
provide threat intelligence feedback to the distributed learning agent regarding the matched threat intelligence feed data, in response to determining that the device should provide threat intelligence feedback to the distributed learning agent,
wherein the providing of the threat intelligence feedback from the supervisory device that is centrally located in the network to the distributed learning agent that is located at the edge of the network causes the distributed learning agent to adjust an operation of the machine learning-based anomaly detector locally executing on the distributed learning agent.

17. The apparatus as in claim 16, wherein the threat intelligence feedback includes one or more of: a resource type, a unique resource identifier, a threat type, or a threat level.

18. The apparatus as in claim 16, wherein the threat intelligence feed data comprises a network address and a threat level associated with the network address.

19. The apparatus as in claim 16, wherein the threat intelligence feedback is configured to cause the distributed learning agent to adjust an anomaly relevancy score used by the distributed learning agent to trigger anomaly reporting.

20. The apparatus as in claim 16, wherein the received notification comprises captured packets, and wherein the process when executed is further operable to:

upload the captured packets to the one or more threat intelligence services.

\* \* \* \* \*